US006342286B1

(12) United States Patent
Hollingshead et al.

(10) Patent No.: US 6,342,286 B1
(45) Date of Patent: Jan. 29, 2002

(54) EMBOSSMENT FOR PLASTIC PANELS

(75) Inventors: Christopher J. Hollingshead, Wabash; Terry L. Farber, Columbia City; Rodney Hardesty, South Whitley, all of IN (US)

(73) Assignee: GenCorp. Inc., Sacramento, CA (US)

( * ) Notice: Subject to any disclaimer, the term of this patent is extended or adjusted under 35 U.S.C. 154(b) by 0 days.

(21) Appl. No.: 09/460,020

(22) Filed: Dec. 13, 1999

(51) Int. Cl.[7] .............................. B32B 7/00; A44B 1/04; B28B 5/00

(52) U.S. Cl. .................... 428/120; 428/99; 264/171.12; 264/241; 24/297

(58) Field of Search .......................... 428/36.9, 99, 121, 428/131, 137, 188, 192; 296/146.7; 264/171.12, 241; 24/297

(56) References Cited

U.S. PATENT DOCUMENTS 4,797,983 A * 1/1989 Barnett et al. ................ 24/289
5,931,525 A * 8/1999 Rickabus .................... 296/214
5,988,678 A * 11/1999 Nakamura et al. .......... 280/751

* cited by examiner

*Primary Examiner*—Donald J. Loney
(74) *Attorney, Agent, or Firm*—Calfee, Halter & Griswold LLP

(57) ABSTRACT

An embossment for a plastic panel is provided. The embossment projects out from the panel and can secure the panel to an object or support the panel away from the object as a standoff. A plurality of support legs are integrally formed to both the embossment and the panel which separates the embossment from the panel and provides stability to the embossment. While attaching the embossment to the vehicle, such as by rotationally inserting a screw, the support legs prevent the embossment from rotating and/or disconnecting from the panel. In this manner, the panel is maintained in a proper location during installation. The support legs have a reduced contact area with the panel such that abnormalities on the show surface that would be created by the embossment are eliminated.

14 Claims, 2 Drawing Sheets

EMBOSSMENT FOR PLASTIC PANELS

BACKGROUND OF THE INVENTION

The present invention relates to the embossment arts. It finds particular application to an embossment for plastic panels, covers, housings, and so forth where abnormalities on the show surface created by the embossment are undesirable.

FIG. 4 shows a prior art embossment 10 that secures a decorative vehicle door panel 15 to the vehicle. The embossment includes a rectangular base portion 20 known as a "dog house". The dog house secures the embossment to the door panel and provides support when the panel is attached into a vehicle by securing a screw into a hole 25 at the top of the embossment. The dog house, however, provides limited stability in preventing the embossment from rotating if a screw is applied with force. The prior art design is also difficult to manufacture and involves complex and expensive tooling. Another shortcoming is that when a large mass of plastic, such as the dog house portion, is molded to the back of a plastic panel, the opposite show surface tends to sink or create an abnormality that is undesirable.

The present invention provides a new and unique embossment for plastic panels that cures the above problems and others.

SUMMARY OF THE INVENTION

In accordance with the present invention, a new an unique plastic panel and embossment is provided. The plastic panel has a show surface and an opposite non-show surface. A plurality of support legs are integrally formed to and project out from the non-show surface of the panel at a base. The base has an area of contact with the panel such that abnormalities on the show surface are reduced. An embossment is integrally formed to the plurality of support legs and is spaced from the non-show surface of the panel. The embossment can attach the panel to an object or support the panel away from the object as a standoff.

In accordance with a more limited aspect of the present invention, the embossment has a tubular shape.

In accordance with yet a more limited aspect of the present invention, the plurality of legs are positioned ninety degrees from each other around the embossment.

In accordance with another aspect of the present invention, a device for attaching a panel to an object, or supports the panel away from the object as a standoff, is provided. A plurality of legs are integrally molded with and project out from the panel where the plurality of legs have a contact area with the panel which reduces abnormalities in the panel during molding of the panel and plurality of legs. An embossment is integrally molded with and projects out from the plurality of legs where the embossment is positioned a selected distance from the panel by the plurality of legs. The embossment can secure the panel to an object or support the panel away from the object as a standoff One advantage of the present invention is that when securing the embossment to a vehicle, the support legs prevent rotation of the embossment caused by, for example, a screw inserted into the embossment.

Another advantage of the present invention is that the support legs simplify the tooling required to form the injection molded parts of the present invention and allow the embossment to be positioned closer to the surface of the panel.

Another advantage of the present invention is that abnormalities on the show surface are reduced or eliminated since the contact area of the support legs with the panel is small as compared to the bottom area of the embossment.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be imitative of the scope of the present invention, wherein.

DETAILED DESCRIPTION OF THE PREFERRED EMBODIMENTS

Figure 1A:
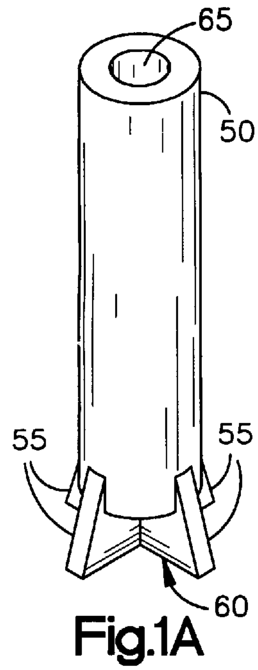
FIG. 1A is an isometric view of an embossment in accordance with the present invention.
Figure 2A:
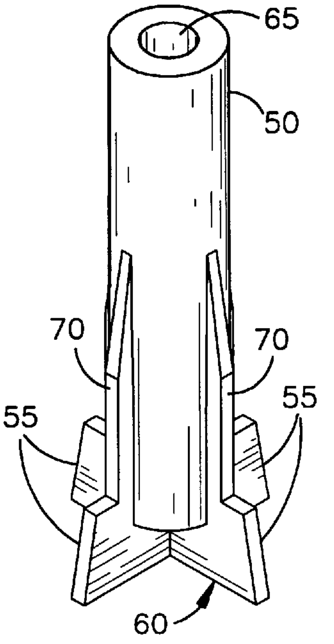
FIG. 2A is an isometric view of another embossment in accordance with the present invention.
Figure 3A:
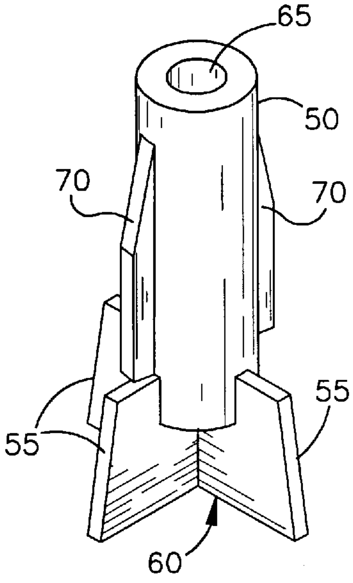
FIG. 3A is an isometric view of another embossment in accordance with the present invention.
Figure 1B:
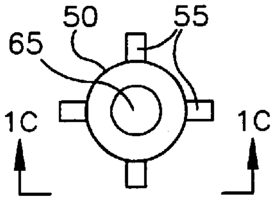
FIG. 1B is a top view of FIG. 1A.
Figure 2B:
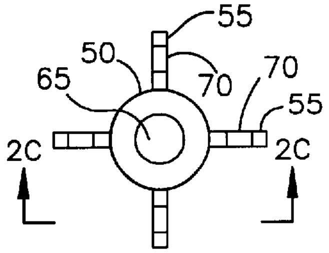
FIG. 2B is a top view of FIG. 2A.
Figure 3B:
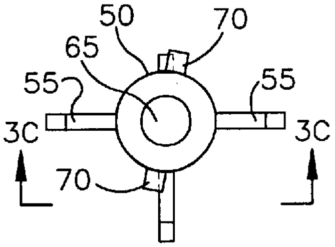
FIG. 3B is a top view of FIG. 3A.
Figure 1C:
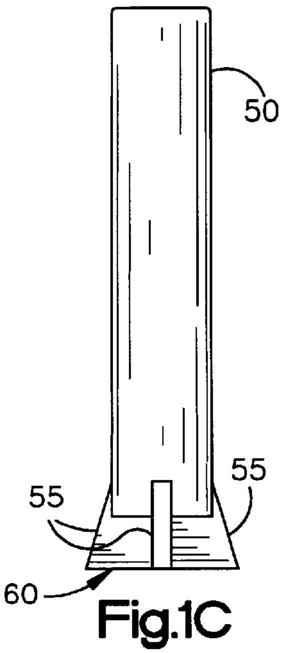
FIG. 1C is a side view of FIG. 1B.
Figure 2C:
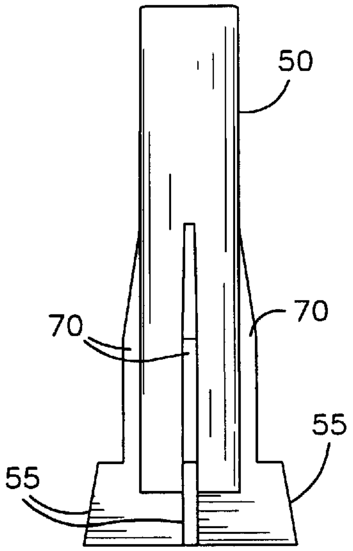
FIG. 2C is a side view of FIG. 2B.
Figure 3C:
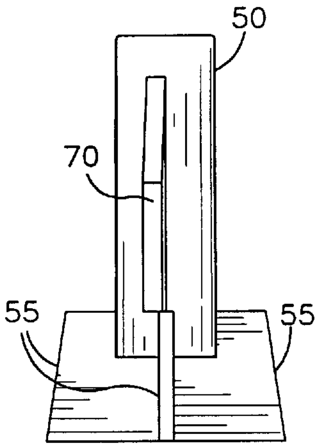
FIG. 3C is a side view of FIG. 3B.
Figure 4:
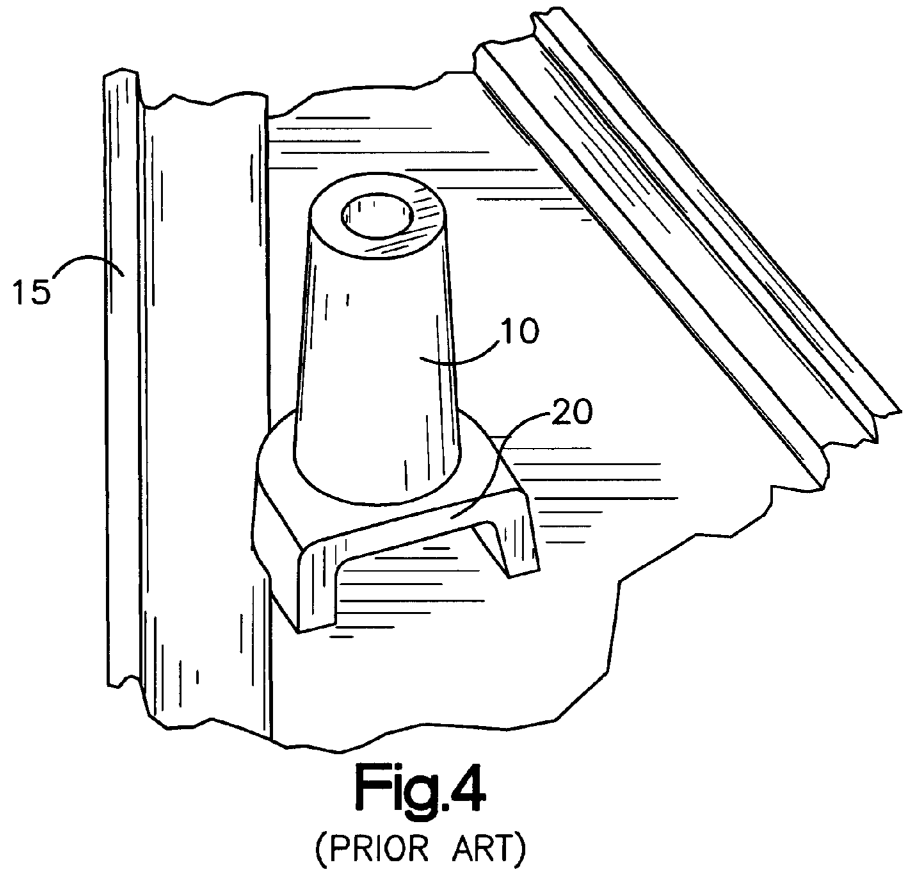
Fig.4 (PRIOR ART)
FIG. 4 is a prior art embossment attached to an automotive panel.

With reference to FIGS. 1A–1C, an embossment 50 is shown that serves to attach or connect a plastic panel (not shown) to a desired location, which includes being a standoff for supporting the panel away from the location. The embossment 50 has a tubular shape, but of course, may be formed with square, rectangle, and triangle shapes as well as other shapes as known to those of ordinary skill in the art. The embossment 50 is supported by an integrally formed plurality of support legs 55. At their base 60, the legs 55 are integrally formed with the panel such that the embossment, the legs, and the panel are integrally formed together using any known plastic molding process. Preferably, these components are formed by injection molded plastic or any other rigid or flexible material as desired.

With the present invention, the support legs 55 space the embossment 50 a selected distance away from a surface of the panel, for example, a non-show surface which is not visible after installing the panel. In this manner, the bottom of the embossment, which typically has a large area of plastic, does not contact the panel. Rather, the base of the support legs 55 has a smaller contact area with the panel. By reducing the area of plastic against the surface of the panel, abnormalities on the opposite show surface of the panel are reduced or eliminated. Additionally, the simple configuration of the support legs simplifies the tooling required to form the present invention and allows the embossment to be positioned closer to the panel surface than the prior art designs.

In the figures, four (4) support legs 55 are shown which are positioned around the embossment at about 90 degrees from each other in a shape of a plus "+" sign. Of course, it is to be appreciated that other configurations can be used such as two criss-crossing legs, or three or more legs. The legs can be equally spaced or offset by any desired angle. This configuration reduces the amount of plastic against the panel, simplifies tooling, yet provides support for the embossment 50.

The embossment 50 further includes a fastener hole 65 defined through and along the axis of the embossment. The fastener hole 65 receives a fastener such as a screw in order to secure the embossment, and thus the panel, to an object such as a vehicle. The support legs 55 provide a support structure to prevent the embossment from rotating while a force is applied to a screw being inserted into the fastener hole 65. Alternately, the embossment 50 can be pin-shaped such that it snap-connects to an object. The embossment can also support the panel as a standoff away from the object.

Figure 5:
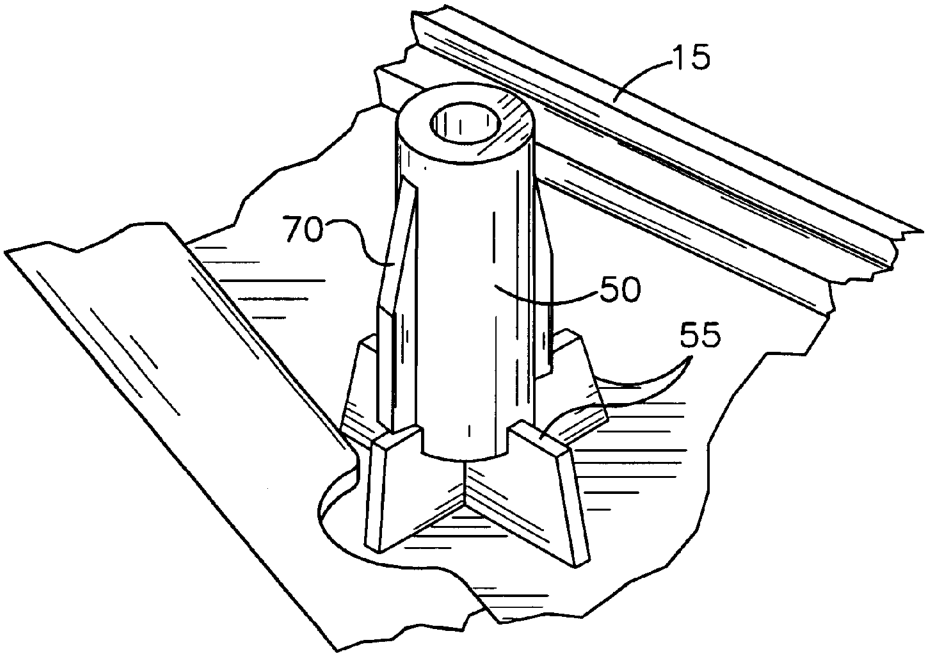
FIG. 5 is an embossment attached to a panel and in accordance with the present invention.

With reference to FIGS. 2A–2C and 3A–3C, another embodiment of the present invention is shown. The embossment 50 includes one or more locator ridges 70 which project out from the embossment. The locator ridges maintain the embossment and panel in a proper position during attachment. For example, ridges 70 can be positioned to maintain the embossment in the correct forward and rearward positions as well as the upward and downward position. These locator ridges are known as fore/aft locators and up/down positive locators. FIG. 5 shows a digital image of the embossment of FIGS. 3A–3C formed to a vehicle panel 15.

The invention has been described with reference to the preferred embodiment. Obviously, modifications and alterations to others upon a reading and understanding of this specification. It is intended to include all such modifications and alterations insofar as they come within the scope of the appended claims are the equivalence thereof.

We claim:

1. A plastic panel and embossment comprising:

a plastic panel having a show surface and an opposite non-show surface;

a plurality of support legs integrally formed to and projecting out from the non-show surface of the panel at a base, the base having an area of contact with the panel such that abnormalities on the show surface are reduced; and an elongated embossment projecting out from the panel, the embossment being integrally formed to the plurality of support legs and spaced from the non-show surface of the panel.

2. The plastic panel and embossment as set forth in claim 1 wherein the embossment is tubular.

3. The plastic panel and embossment as set forth in claim 2 wherein the plurality of legs are spaced circumferentially around the embossment at 90 degrees from each other.

4. The plastic panel and embossment as set forth in claim 1 further including at least one locator ridge projecting out from the embossment, the at least one locator ridge for aligning the embossment.

5. The plastic panel and embossment as set forth in claim 1 wherein the embossment includes a hole axially defined in the embossment for receiving a fastener.

6. A device for connecting a panel to an object comprising:

a plurality of legs integrally molded with and projecting out from the panel, the plurality of legs having a contact area with the panel which reduces abnormalities in the panel during molding of the panel and plurality of legs; and an elongated embossment for connecting the panel to an object, the embossment being integrally molded with and projecting out from the plurality of legs, the embossment being positioned a selected distance from the panel by the plurality of legs.

7. The device as set forth in claim 6 wherein the embossment is tubular.

8. The device as set forth in claim 7 wherein the plurality of legs are each positioned 90 degrees from each other around the embossment.

9. The device as set forth in claim 8 wherein the embossment includes a hole axially defined in the embossment for receiving a fastener.

10. The device as set forth in claim 6 further including at least one locator ridge projecting out from the embossment, the at least one locator ridge for aligning the panel to the object during connecting.

11. The device as set forth in claim 6 wherein the plurality of legs are equally spaced from each other.

12. The device as set forth in claim 11 wherein the plurality of legs are spaced forming a plus-sign configuration.

13. A process of forming a plastic panel including an embossment comprising the steps of:

molding a plastic panel;

integrally molding a support structure projecting out from the panel, the support structure having a reduced contact area with the panel so that abnormalities in the panel are reduced; and integrally molding an elongated embossment to the support structure and projecting out therefrom, the embossment being spaced a selected distance from the panel by the support structure.

14. The process of forming a plastic panel as set forth in claim 13 wherein the support structure includes a plurality of legs.

* * * * *